Nov. 17, 1925.

G. PETER 1,561,616

MACHINE FOR MAKING IMPRESSIONS

Filed March 25, 1924     4 Sheets-Sheet 1

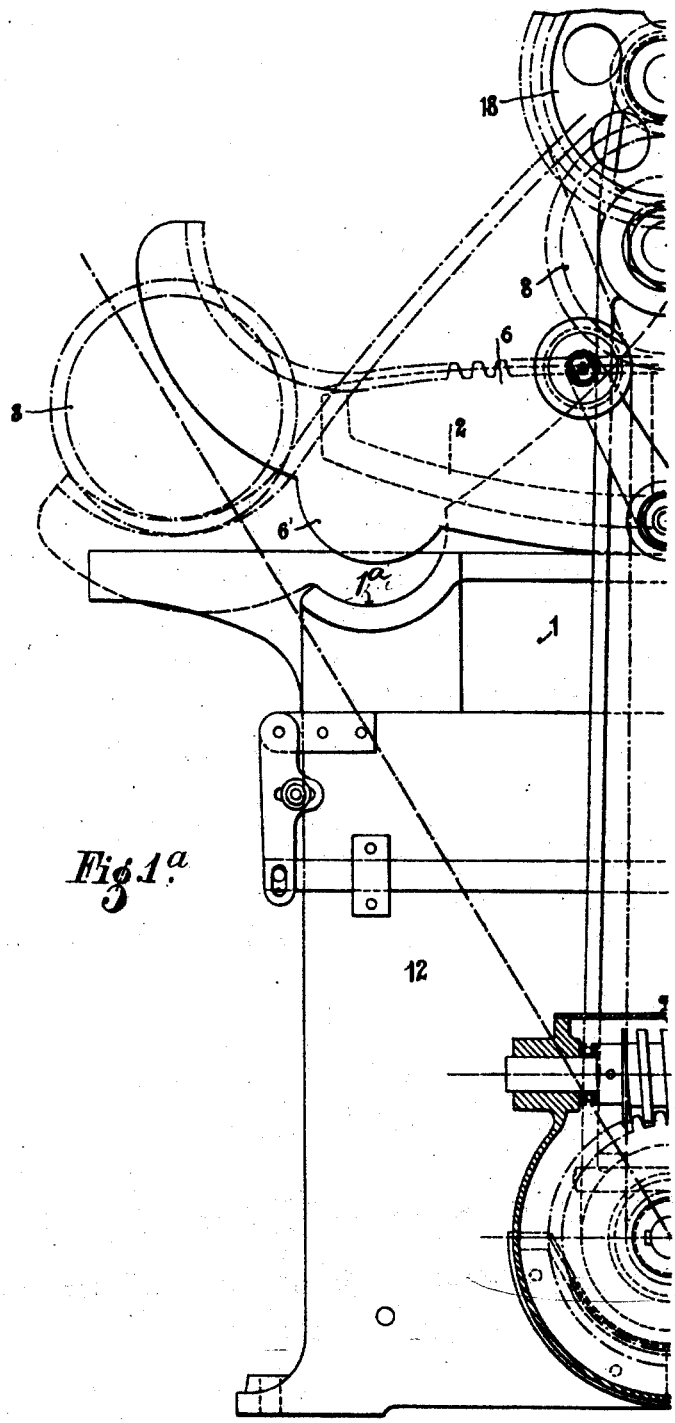

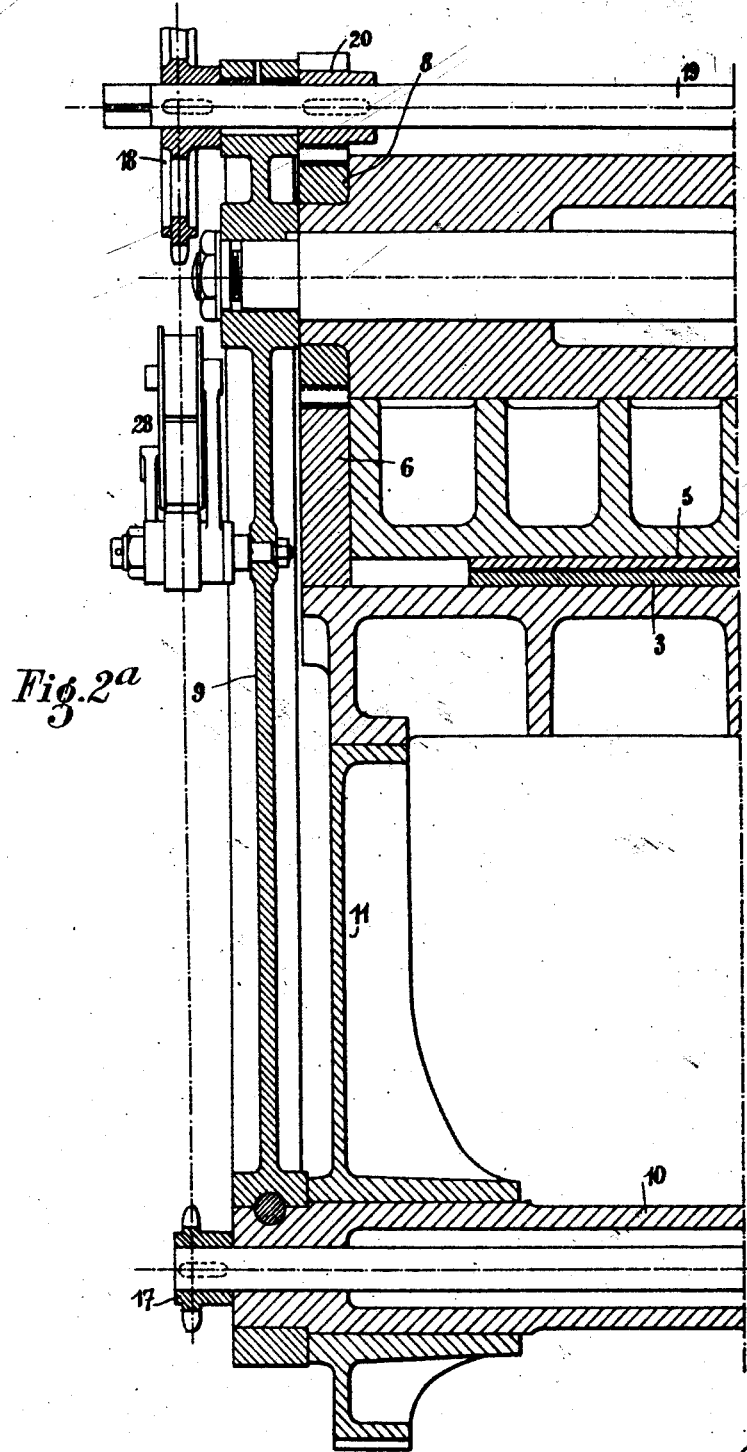

Patented Nov. 17, 1925.

1,561,616

UNITED STATES PATENT OFFICE.

GEORGES PETER, OF MALAKOFF, FRANCE.

MACHINE FOR MAKING IMPRESSIONS.

Application filed March 25, 1924. Serial No. 701,752.

*To all whom it may concern:*

Be it known that I, GEORGES PETER, a citizen of France, and a resident of Malakoff, in the Department of Seine, France, have invented certain new and useful Improvements in Machines for Making Impressions, of which the following is a specification.

The present invention has for its object the provision of a machine wherewith to make the impression of a typographic form on a special carton or sheet from which the final form is afterwards produced by casting in an appropriate mould, said final form serving to yield impressions in rotary machines as well as in machines with flat impression.

The machine constituting the subject matter of the present invention has for its object to obtain impressions on dry calendered sheets.

Figure 1:
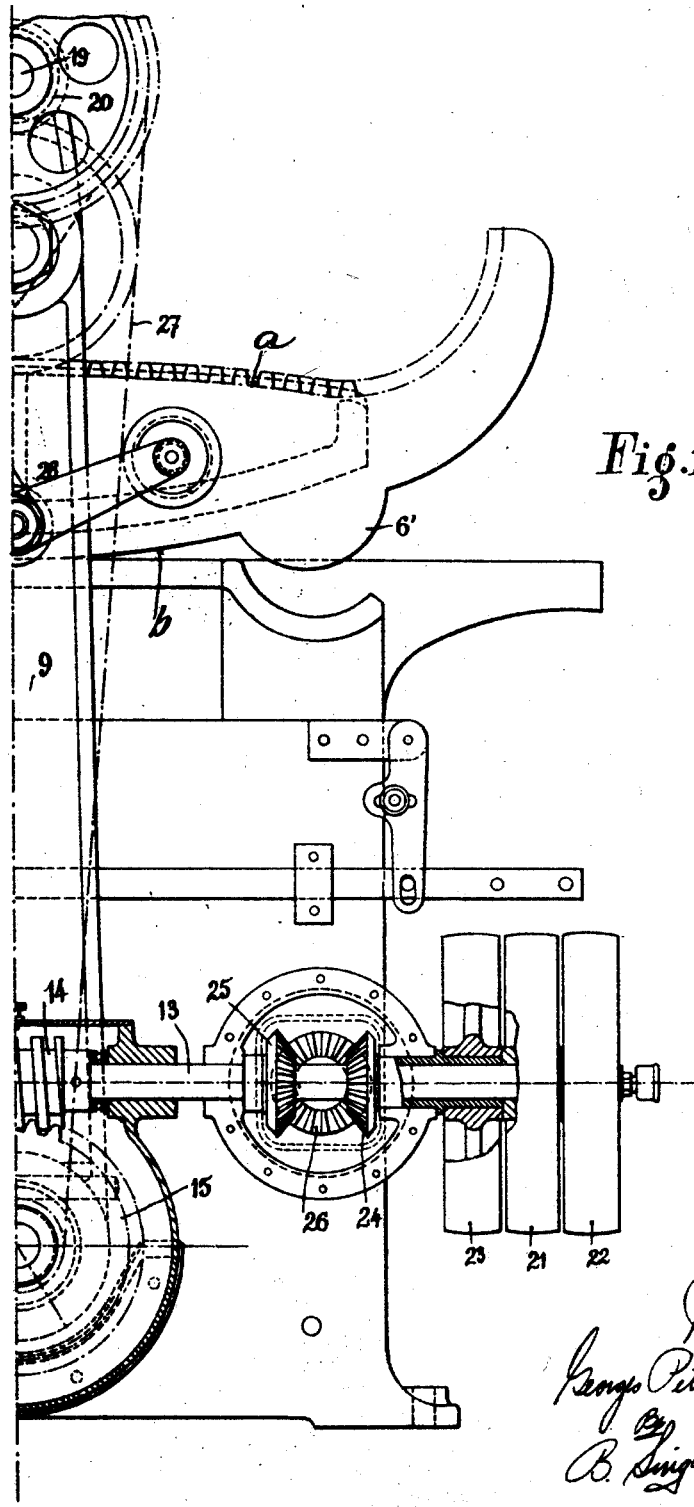

The annexed drawings, to which reference is made, illustrate:

Figure 1 is an elevation partly in section of one-half of the machine.

Figure 1ª is a similar view of the other half of the machine.

Figure 2:
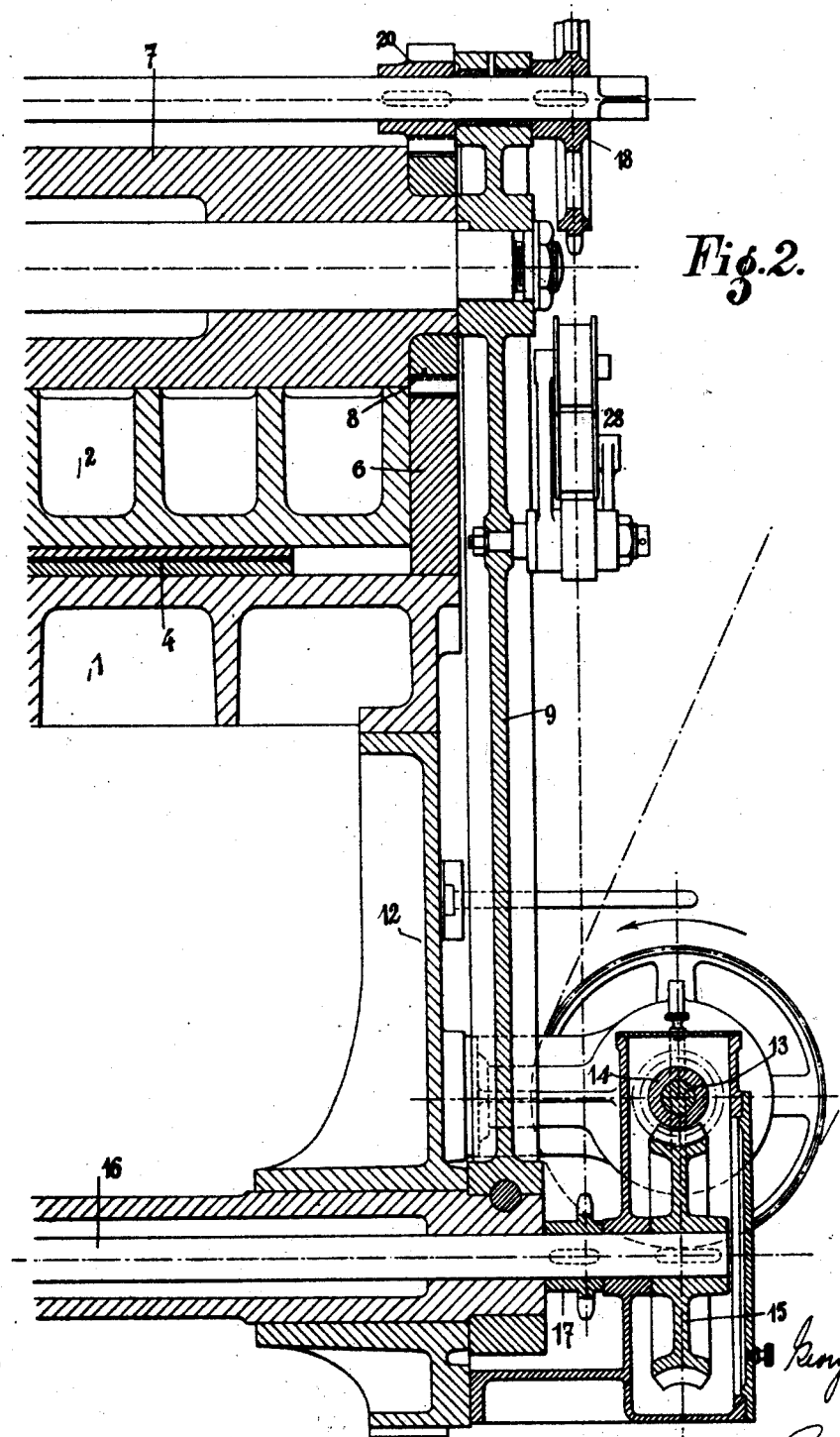

Figure 2 is a longitudinal central sectional view of one-half of the machine.

Figure 2ª is a similar view of the other half of the same.

The machine comprises a fixed table 1 on which a movable table 2 can roll, the surface of the same, facing the table 1 forming a segment of a cylinder of great radius.

The form 3 for receiving the sheet 4 is placed on the table 1. The latter presents a plane unobstructed surface which facilitates handling of the sheet. The elastic layer 5 can be merely placed on the movable table 2 or may be fixed on the same if preferred. At the beginning of the operation the table 2 is raised as indicated by dotted lines in Figure 1.

It is obvious that the upper curve of the movable table 2 must be arranged in such manner that in the angular displacement of the cylinder 7 inducing the oscillation of the said movable table, the generatrix of the lower curvature in contact with the bed must always be at the same distance from the fixed table so as to produce uniform pressure.

The movable table 2 is provided with two walls 6. The lower part rests on the fixed table 1 and the upper part is toothed, the teeth extending from one end to the other of the movable table.

The displacement of the movable table 2 is obtained by means of a cylinder 7 provided with two tooth-wheels 8. The upper part of the table 2 is constituted by a curve, and provides that the distance between the two tables be constant from the beginning to the end of the operation, and hence regularity of pressure is assured. The axle of the cylinder 7 is fixed on two levers 9 keyed on a hollow axle 10 arranged to turn in a suitable angle in the framing 11, 12.

The driving shaft 13 transmits the motion to the table 2 by means of a worm 14 which coacts with a worm-wheel 15, on a shaft 16, and with endless chains 27 and chain wheels 17, 18, and toothed wheels 20 which engage toothed wheels mounted on the cylinder 7.

At each oscillation of the levers 9 the table 2 performs its useful stroke in the one or in the other direction and is lifted at each end by projections 6' which oscillate in corresponding recesses 1ª of the table 1.

The change of direction is obtained by a single belt. The device is here shown as comprising a loose pulley 21, two fixed pulleys 22 and 23, one of which is keyed directly on the shaft 13 and the other on a bush carrying a cog wheel 24 which actuates a wheel 25 keyed on the shaft 13 and with the aid of a third intermediate wheel 26 which is loose on its axle.

The chains 27 are provided with spanners 28 articulated in order to assure the tension of the chains in both directions of travel.

The reverse of the operation or rotation is obtained by displacing the belt from the loose pulley on one or the other of the pulleys controlling the worm. Any other suitable means may be employed for this purpose.

It will be noted that the reverse of the operation is obtained by the rotation of the upper drum in one or the other direction, the drum carrying at each end a gear in mesh with the rack sectors of the movable table as shown.

It is well understood that in case of an electric control, the change of the travelling direction could be constituted by any known device permitting to change the sense of rotation of the electric motor, with previous stopping at the end of the stroke.

The machine as described above permits of being used not only for making impressions on sheets employed in stereotyping but also on any other suitable substance. The machine permits, among others, to take impressions on sheets of lead in order to obtain subsequently stereotypes for galvanoplastic purposes, in a single piece and of great size.

What I claim is:

1. In a machine for making impressions a fixed table, a movable table curved on its surface facing the fixed table, means to dispose the form to be reproduced between the said tables and means to apply a rolling motion to said movable table at a strong pressure against the fixed table, to produce the necessary impression.

2. In a machine for making impressions from a typographic form, a fixed table, means to arrange on the same the form to be reproduced as well as the sheet receiving the impression, a movable table having a surface curved according to a great radius, means to apply said surface with strong pressure against the fixed table, means to roll the said movable table during working, means to lift said table at the end of the stroke and means to fix an elastic layer between said sheet and said movable table.

3. In a machine for making impressions from a typographic form, a fixed table, means to arrange on the same the form to be reproduced as well as the sheet receiving the impression, a movable table having a surface curved according to a great radius, means to apply said surface with strong pressure against the fixed table, means to roll the said movable table during working, and means to lift said table at the end of the stroke.

4. In a machine for making impressions, a fixed table, a curved table, an axle, two levers on the same, a cylinder on the upper extremity of said levers, to roll on the upper surface of said movable table, and toothing between said cylinder and said table, means to interpose the form and the sheet between the two tables and means to secure the change of the travelling direction and the stopping at the end of each stroke.

In witness whereof I affix my signature.

GEORGES PETER.